United States Patent [19]
Golding et al.

[11] Patent Number: 5,956,739
[45] Date of Patent: *Sep. 21, 1999

[54] SYSTEM FOR TEXT CORRECTION ADAPTIVE TO THE TEXT BEING CORRECTED

[75] Inventors: Andrew R. Golding, Cambridge, Mass.; Dan Roth, Rehovot, Israel

[73] Assignee: Mitsubishi Electric Information Technology Center America, Inc., Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,928

[22] Filed: Jun. 25, 1996

[51] Int. Cl.$^6$ ........................................... G06F 17/00
[52] U.S. Cl. ........................... 707/533; 707/532; 707/534
[58] Field of Search ..................................... 707/533, 532, 707/534

[56] References Cited

U.S. PATENT DOCUMENTS

| | | | |
|---|---|---|---|
| 5,148,367 | 9/1992 | Saito et al. | 364/419 |
| 5,258,909 | 11/1993 | Damerau et al. | 364/416.22 |
| 5,572,423 | 11/1996 | Church | 707/533 |
| 5,659,771 | 8/1997 | Golding | 395/795 |
| 5,765,180 | 6/1998 | Travis | 707/533 |
| 5,812,863 | 9/1998 | Ishikawa | 707/533 |

OTHER PUBLICATIONS

Golding, Andrew; Roth, Dan; "Applying Winnow to context-sensitive spelling correction"; Machine Learning: Proceedings of the 13th International Conferenced; 182–190, Apr. 1996.

Golding, Andrew; Roth, Dan; "A Bayesian hybrid method for context-sensitive spelling correction"; Proceeding of the Third Workshop on Very Large Corpora; pp. 39–53, May 1995.

*Primary Examiner*—Mark K. Zimmerman
*Assistant Examiner*—Motilewa Good-Johnson
*Attorney, Agent, or Firm*—Dirk Brinkman

[57] ABSTRACT

A system is provided for correcting users' mistakes including context-sensitive spelling errors and the like in which an adaptive correction algorithm is utilized which is trained on not only a conventional training corpus, but also on the text which is being corrected, thus to permit the correction of words based on the particular usages of the words in the text being corrected, taking advantage of the fact that the text to be corrected is by and large already mostly correct.

22 Claims, 3 Drawing Sheets

SYSTEM FOR TEXT CORRECTION ADAPTIVE TO THE TEXT BEING CORRECTED

FIELD OF THE INVENTION

This invention relates to the correction of text, and more particularly to an adaptive system for text correction in which a training set is utilized that includes text which is assumed to be mostly correct.

BACKGROUND OF THE INVENTION

In the past, especially with respect to text editing, user mistakes such as spelling errors were corrected utilizing conventional spell-checking systems utilizing lookup tables. Subsequently, more sophisticated spell-checking systems were developed in which the context in which the word occurred was taken into account. These systems traditionally involved the utilization of so-called training corpora which contain examples of the correct use of the words in the context of the sentences in which they occurred.

One of the major problems with such context-sensitive spelling-correction systems is the inability of these systems to take into account situations in which the corpus on which they were trained is dissimilar to the target text to which they are applied. This is an important problem for text correction because words can be used in a wide variety of contexts; thus there is no guarantee that the particular contextual uses of the words seen in the target text will also have been seen in the training corpus.

Consider, for example, an algorithm whose job is to correct context-sensitive spelling errors; these are spelling errors that happen to result in a valid word of English, but not the word that was intended—for example, typing "to" for "too", "casual" for "causal", "desert" for "dessert", and so on. It is very difficult to write an algorithm to do this by hand. For instance, suppose we want to write an algorithm to correct confusions between "desert" and "dessert". We could write rules such as: "If the user types 'desert' or 'dessert', and the previous word is 'for', then the user probably meant 'dessert'". This rule would allow the algorithm to fix the error in: "I would like the chocolate cake for desert". The rule would not work, however, for many other cases in which "desert" and "dessert" were confused, for instance: "He wandered aimlessly through the dessert", where "desert" was probably intended. To fix this particular sentence, a different rule is needed, such as: "If the user types 'desert' or 'dessert', and the previous two words are a preposition followed by the word 'the', then the user probably meant 'desert'". In general, it is extremely difficult to write a set of rules by hand that will cover all cases.

This difficulty of writing a set of rules by hand is the motivation for moving to adaptive algorithms—algorithms that learn to correct mistakes by being trained on examples. Instead of writing rules by hand, it is much easier to provide a set of examples of sentences that use "desert" and "dessert" correctly, and let the algorithm automatically infer the rules behind the examples.

A wide variety of techniques have been presented in the Machine Learning literature for training algorithms from examples. However, what they all have in common is that they make the assumption of representativeness; that is, they assume that the set of examples that the algorithm is trained on is representative of the set of examples that the algorithm is asked to correct later. Put another way, they assume that the examples in the training and test sets are drawn, in an unbiased way, from the same population. It follows that whatever rules the algorithm learns from the training set will apply correctly to the test set. For example, if the training set contains examples illustrating that the word "for" occurs commonly before "dessert", but rarely before "desert", then, by the assumption of representativeness, the same distributional property of "for" should hold in the test set. If this assumption is violated, the algorithm's performance on the test set will degrade, because the rules it learned from the training set will not necessarily carry over to the test set. Existing machine learning techniques are therefore effective only to the extent that the training set is representative of the test set. This is a serious limitation, since, in general, there is no way to guarantee representativeness.

SUMMARY OF INVENTION

In order to provide for a more flexible method of correcting words in a text, in the subject system not only is a conventional training corpus used, but also the target text is analyzed to ascertain how the words to be corrected are used elsewhere in the text. Assuming that, on the whole, the words are used properly throughout the text, then when checking a particular occurrence of one of the words, the suggestion is made that the word take on the form of its usage in similar contexts that appear throughout the text.

The subject system therefore provides a training procedure called sup/unsup which utilizes both a conventional training corpus and the target text to overcome this limitation of existing techniques, thereby enabling adaptive correction algorithms to work well even when the training set is only partially representative of the test set.

The sup/unsup procedure works simply by training the algorithm, whichever adaptive correction algorithm is of interest, on both the traditional training set and the test set. It may seem, at first glance, to be counterproductive to train on the test set, as this set will presumably contain errors. However, the sup/unsup procedure is based on the assumption that although the test set contains errors, they will tend to be distributed sporadically through the test set; thus the learning procedure should still be able to extract correct rules, despite the presence of this noise. An example will clarify this concept.

Returning to the problem of correcting context-sensitive spelling errors for the case of "desert" and "dessert", suppose the test set is a news article containing 24 occurrences of the phrase "Operation Desert Storm" and 1 occurrence of the incorrect phrase "Operation Dessert Storm". Following the sup/unsup procedure, the algorithm is trained on its usual training set plus this test set. The objective of training is to extract rules about when to use "desert" versus "dessert". The test set suggests the rule: "If the user types 'Desert' or 'Dessert', and the previous word is 'Operation', and the following word is 'Storm', then the user probably meant 'Desert'". This rule will work for 24 out of the 25 examples to which it applies. Although it is not perfect, it is reliable enough that the system can safely learn this rule. It can then apply the rule to the very same test set from which it was learned to detect the 1 occurrence of "Operation Dessert Storm" that violates the rule.

The strength of this procedure is that it can detect sporadic errors, such as the single incorrect spelling "Operation Dessert Storm" in a test document, even if there are no relevant occurrences in the training set—that is, even if the training set is unrepresentative of the test set. One way to look at this procedure is that it is checking for inconsistencies in the test set, rather than "errors" with respect to some training set that is deemed error-free. The procedure is, of course, still able to detect errors that are illustrated by the original training set. The weakness of the procedure is that it cannot detect systematic errors in the test set. For example, if the user types "Operation Dessert Storm" every time, the system will be unable to find the error.

It should be borne in mind that the effectiveness of the sup/unsup procedure depends on two factors. The first is the size of the test set; the larger the test set, the easier it will be to detect inconsistencies. For instance, in the example above, there were 24 correct occurrences of "Operation Desert Storm"; if instead the test set were much smaller and had only 2 occurrences, the algorithm might not have enough information to learn the rule about "Operation" and "Storm" implying "Desert". The second factor affecting the effectiveness of sup/unsup is the percentage of mistakes in the test set. In the example above, the user made 1 mistake in 25 occurrences of "Operation Desert Storm"; if instead the level were 10 or 15 out of 25, it would become difficult for the algorithm to learn the appropriate rule.

It will be appreciated that the sup/unsup training procedure applies to any adaptive correction algorithm, regardless of the means used for adaptation, and regardless of the correction task under consideration.

The term "adaptive correction algorithm" as used herein refers to algorithms that correct users' mistakes, e.g., context-sensitive spelling errors, and that learn to do their job of correcting mistakes by being trained on examples that illustrate correct answers and/or mistakes.

More particularly, in one embodiment, the specific algorithm utilized for target text analysis involves scanning the full collection of training texts, which in this embodiment includes both a conventional training corpus, and the target text to which the system is being applied, so as to ascertain the features that characterize the context in which each word that is being corrected may appear. By features is meant two types of text patterns. The first type is called context words, and refers to the presence of a particular keyword within some fixed distance of the target word that is being corrected. For instance, if the words being corrected are "desert" and "dessert", then useful context words might include "hot", "dry", and "sand" on the one haled, and "chocolate", "cake", and "sweet" on the other hand. The presence of words in the former group within, for instance, 10 words on either side of the target word tends to indicate that "desert" was intended as the target word; whereas the presence of words in the latter group tends to imply that "dessert" was intended.

The second type of feature is called collocations, and refers to the pattern of part-of-speech tags and specific words in the immediate context of the target word. For instance, if the words being corrected are again "desert" and "dessert", then one useful collocation might be "'PREPOSITION the' occurs immediately to the left of the target word". This collocation matches any sentence in which the target word, which is either "desert" or "dessert", is directly preceded by the word "the", which in turn is directly preceded by a word that has been tagged as "PREPOSITION". For instance, the collocation would match the sentence "He went to the desert", in which the target word, "desert", is immediately preceded by the word "the", which is immediately preceded by the word "to", which is tagged as a preposition. This collocation, when matching a sentence, tends to imply that "desert" was intended as the target word, and not "dessert". In one embodiment, the part-of-speech tags needed for this analysis are derived by a lookup procedure that utilizes a dictionary which lists, for any given word, its set of possible part-of-speech tags. A collocation is considered to match a sentence if each specific word in the collocation matches the corresponding word in the sentence, and if each part-of-speech tag in the collocation is a member of the set of possible part-of-speech tags of the corresponding word in the sentence.

The subject system derives a set of features of the two types described above by scanning through the training texts for all occurrences of the words being corrected. For each such occurrence, it proposes as candidate features all context words and collocations that match that occurrence. After working through the whole set of training texts, it collects and returns the set of features proposed. In one embodiment, pruning criteria are applied to this set of features to eliminate features that are based on insufficient data, or that are ineffective at discriminating among the words being corrected.

Having derived a set of features that characterize the contexts in which each of the words being corrected tends to occur, then by a conventional Bayesian method, these features are used as evidence to ascertain the probability that each of the words being corrected is in fact the word that the user intended to type. Having derived these probabilities, the word selected as correct is that word having the highest probability. For instance, if the word "desert" is used 100 times in a particular context, and if the word "dessert" is used either not at all or a limited number of times in the same context, then the subject system will select "desert" as the correct word in future occurrences of this context, even if the user typed "dessert". Bayesian analysis for context-sensitive spelling correction is described in the paper, "A Bayesian hybrid method for context-sensitive spelling correction", by Andrew R. Golding, in the Proceedings of the Third Workshop on Very Large Corpora, at the June 1995 conference of the Association for Computational Linguistics, pages 39–53.

Thus both a conventional training corpus and a special training corpus involving the target text are utilized to ascertain the correct spelling of a target word in the text. The conventional training corpus is merged with the target-text corpus so that context-sensitive spelling correction is based on both corpora. The result is that improved spelling correction is achieved through the analysis of the use of the word throughout the target text, as well as in the conventional training corpus.

In summary, a system is provided for correcting users' mistakes including context-sensitive spelling errors and the like in which an adaptive correction algorithm is utilized which is trained on not only a conventional training corpus, but also on the text which is being corrected, thus to permit the correction of words based on the particular usages of the words in the text being corrected, taking advantage of the fact that the text to be corrected is by and large already mostly correct.

BRIEF DESCRIPTION OF DRAWINGS

These and other features of the Subject Invention will be better understood taken in conjunction with the Detailed Description taken in conjunction with the Drawings, of which.

DETAILED DESCRIPTION

Figure 1:
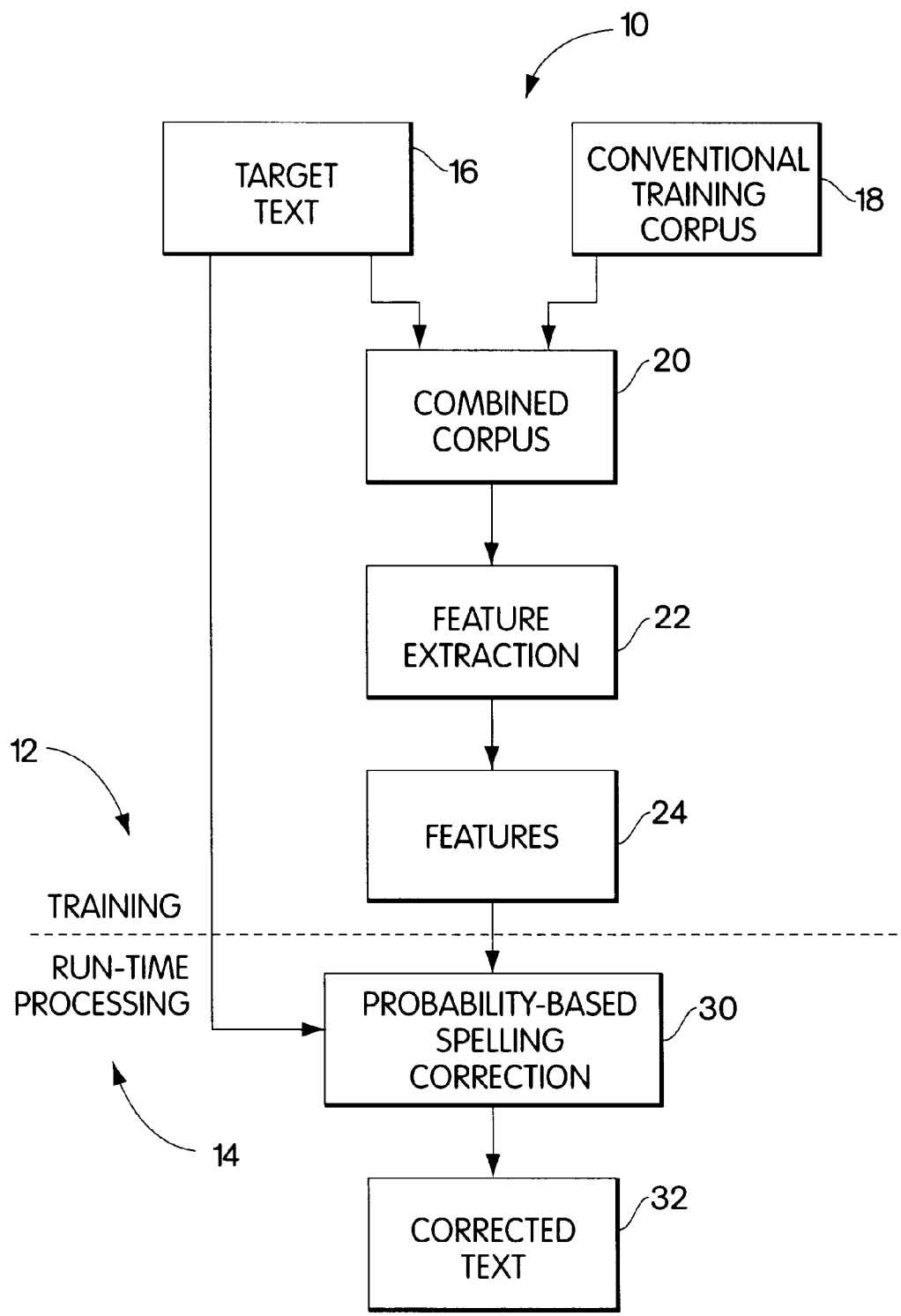
FIG. 1 is a flowchart indicating training and run-time processing to accomplish word correction in a target text in which a combined corpus of the target text and a conventional training corpus are utilized followed by a probability-based spelling-correction system utilizing the combined corpus.

Referring now to FIG. 1, a system 10 for correcting text includes a training phase 12, followed by a run-time processing phase 14. In the training phase, target text 16 is combined with a conventional training corpus 18 to provide a combined corpus 20 in which the corpus utilized includes the target text and therefore is exceedingly useful in tailoring the text-correction system to the text in question.

The combined corpus is utilized in a feature-extraction step 22 in which selected features are culled from the combined corpus as illustrated at 24. These features include context words and collocations, so that it is these features which provide evidence that allows the computation of the probability of each word that could have been intended for the target word in the target text.

During run-time processing, a probability-based spelling-correction system 30 is provided with the target text and determines first a target word and secondly the probability of the correctness of this word based on the combined corpus and the selected features. For instance, the list of selected features is matched against each occurrence of the target word in the target text, so as to collect evidence about the likely intended identity of the target word. The evidence is combined into a single probability for each word that could have been intended for the target word using Bayes' rule, in one embodiment. Other spelling-correction systems for use in determining the identity of the correct word include a system based on the Winnow algorithm which employs a multiplicative weight-updating scheme as well as a variant of weighted-majority voting. This technique is described in a paper entitled, "Applying Window to Context-Sensitive Spelling Correction" by Andrew R. Golding and Dan Roth, in Machine Learning: The Proceedings of the 13th International Conference, Lorenza Saitta, ed., Morgan Kaufmann, San Francisco, Calif., 1996.

It can be seen that the spelling correction in step 30 is provided, in one embodiment, by a conventional Bayesian method which, rather than using a conventional training corpus alone, utilizes a corpus which includes the target text. The advantage of so doing is that the system for finding the probability of the correct word is enhanced by inspecting the target text for similar occurrences of the word so that a more powerful technique for obtaining the correct word is achieved.

The result of the probability-based spelling correction is the suggestion of a word to be inserted in the text in place of the target word if the target word needs changing yielding a corrected text 32 as illustrated.

Figure 2:
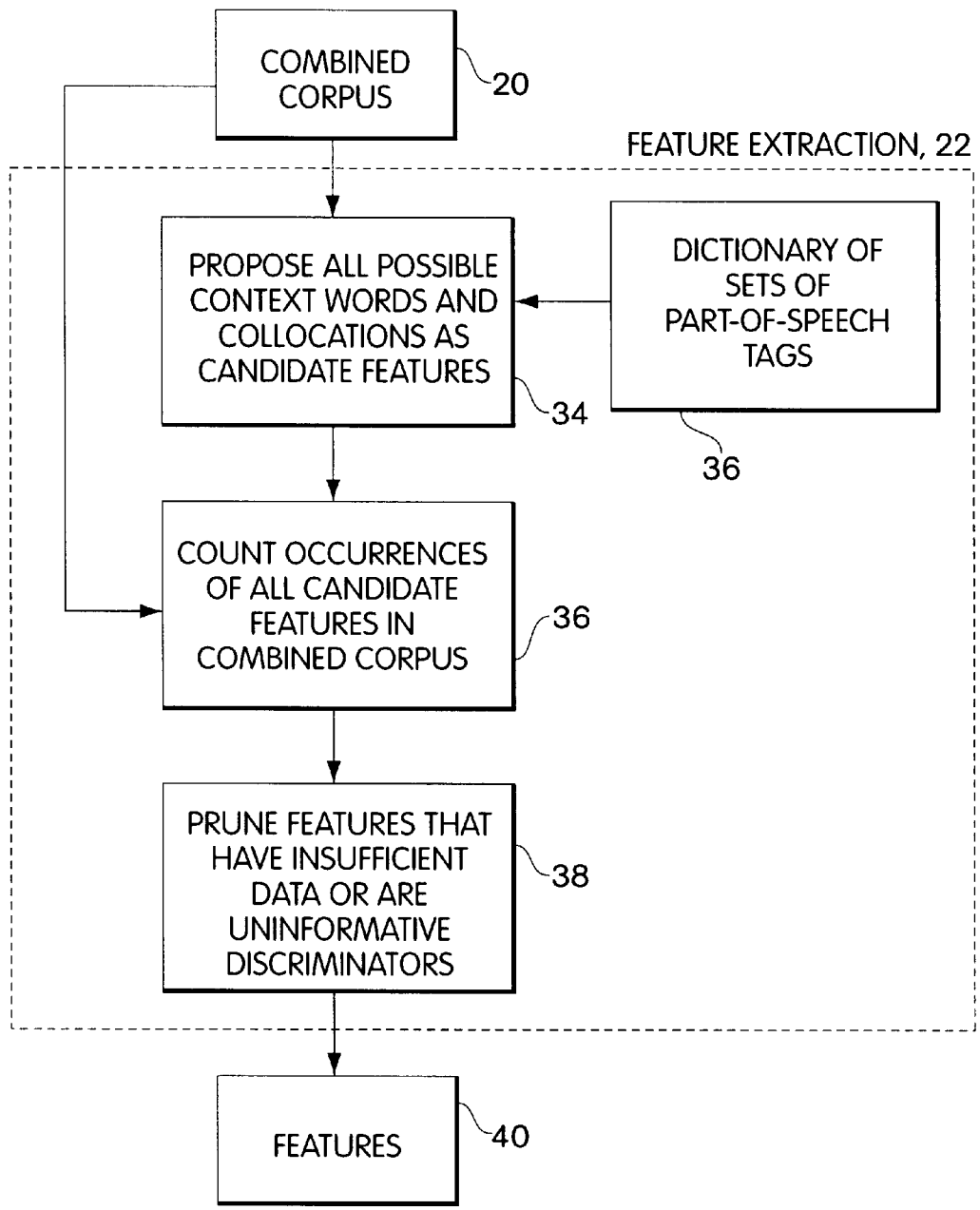
FIG. 2 is a flowchart of the feature-extraction system of FIG. 1 illustrating the utilization of a dictionary of sets of part-of-speech tags utilized in the proposal of all possible context words and collocations as candidate features, followed by the counting of occurrences of all candidate features in the combined corpus, in turn followed by pruning features that have insufficient data or are uninformative discriminators.

Referring now to FIG. 2, feature extraction 22 is detailed such that in one embodiment, the output of the combined corpus 20 is coupled to a module 34 which lists all possible context words and collocations as candidate features, utilizing a dictionary 36 of sets of part-of-speech tags. For instance, for the word "walks", the dictionary would give the set of part-of-speech tags consisting of "PLURAL NOUN" and "THIRD PERSON SINGULAR VERB". The process of listing all possible context words and collocations is illustrated by the sentence, "John lives in the desert", in which the target word is "desert", for which the user could intend either "desert" or "dessert". In this sentence, the set of possible part-of-speech tags for "in" consists of the single tag "PREPOSITION", while that for the word "the" consists of the single tag "DETERMINER". In this case, four context words and four collocations are proposed as candidate features. The context words are the words "John", "lives", "in", and "the", each of which is a word that occurs nearby the target word. The collocations are: "'in the' occurs immediately to the left of the target word"; "'PREPOSITION the' occurs immediately to the left of the target word"; "'in DETERMINER' occurs immediately to the left of the target word"; and "'PREPOSITION DETERMINER' occurs immediately to the left of the target word". These four collocations represent all ways of expressing the nearby context of the target word in terms of specific words and part-of-speech tags.

Having provided a list of all possible context words and collocations as candidate features, as seen at 36, a module counts the occurrences of all candidate features in the combined corpus 20, followed by a pruning step at 38 to prune features that have insufficient data or are uninformative discriminators. By insufficient data is meant the number of occurrences of the feature in the training corpus is below a prespecified threshold, which, in one embodiment, is set to 10. By uninformative discriminator is meant that the presence of the feature fails to be significantly correlated with the identity of the target word, as determined by a chi-square statistical test, which, in one embodiment, is set to the 5% level of significance. The result is a list of features 40 to be utilized in the run-time processing for probability-based spelling correction.

Figure 3:
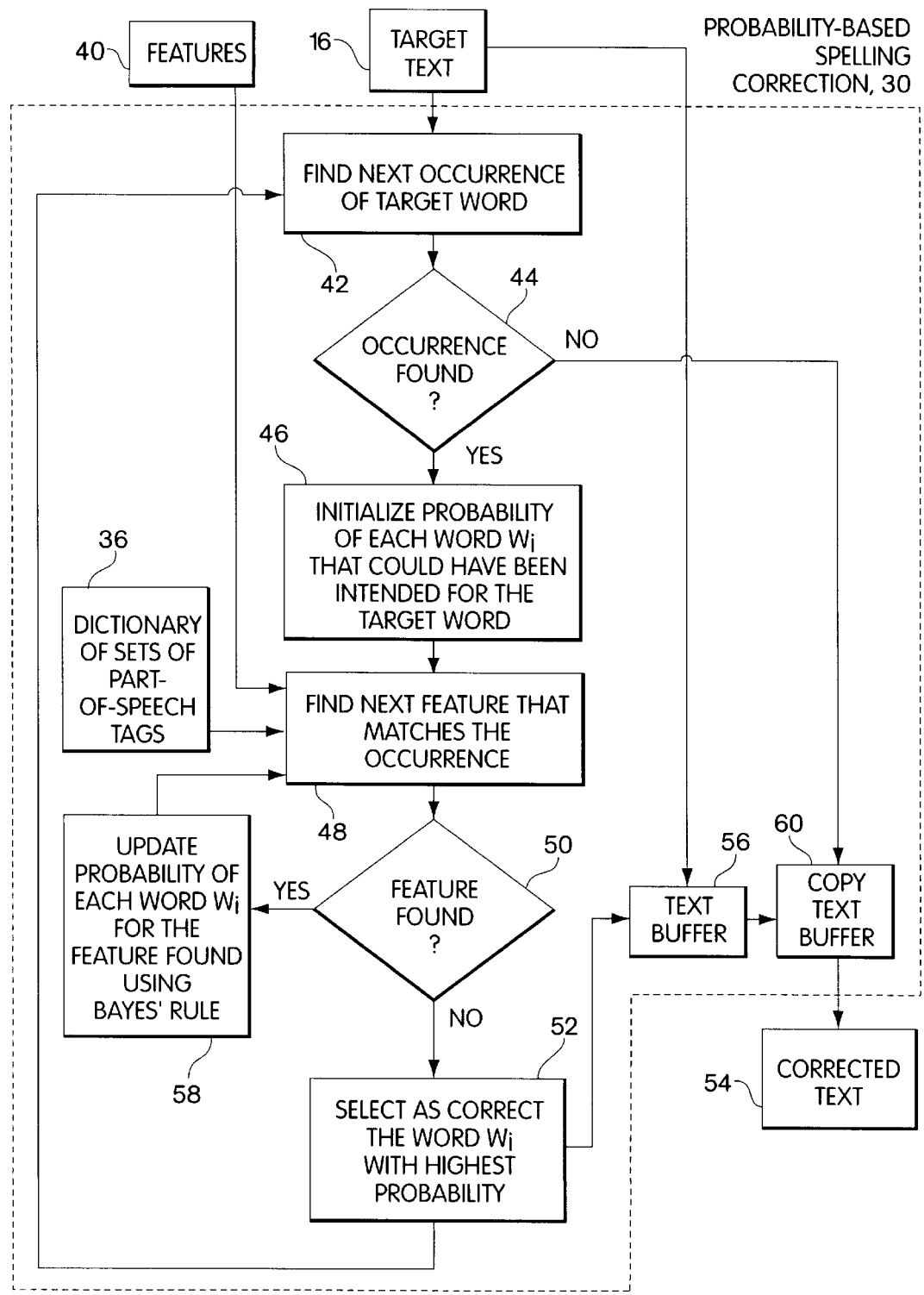
FIG. 3 is a flowchart of the probability-based spelling-correction system of FIG. 1 illustrating a sequence of finding successive occurrences of the target word in the target text, and for each such occurrence, finding in turn all features that match the occurrence, and combining the evidence from these features using Bayes' rule so as to select the word that has the highest probability of being the word that was intended for the target word.

Referring now to FIG. 3, the system 30 for performing probability-based spelling correction from target text 16 and features 40 includes, as a first step, finding the next occurrence of a given target word as illustrated at 42. Upon a determination at 44 of the occurrence of the target word in the target text, module 46 initializes the probability of each word, $w_i$, that could have been intended for the target word. In one embodiment, the probability of each word, $w_i$, is set to the ratio of the probability that the word occurred in the combined corpus to the total probability that any of the words $w_i$ occurred in the corpus.

Having initialized the probability of each word, $w_i$, module 48 finds the next feature that matches the occurrence of the target word. The inputs to this module are features 40 and the dictionary of sets of part-of-speech tags 36. What is happening is that having found the occurrences of the target word, the system now finds which features in its list of possible features match each occurrence of the target word. The utilization of features enhances the robustness of the system in that not only must the probability be based on the target word occurrence, it must also be based on the presence of features that match that target word occurrence.

Assuming that the next feature that matches the occurrence is found, then module 58 updates the probability of each word, $w_i$, that could have been intended for the target word, using Bayes' rule. The probability update is performed to adjust the probability for each word, $w_i$, so as to take into account the evidence about the likely identity of the target word that is provided by the feature that matched the target word occurrence. As a result, when all features that match the target occurrence have been processed, a probability will have been calculated, based on the context of the target word, that measures the probability that each word $w_i$ is the word that was intended for the target word given the context in which it occurred. This is done by gathering the evidence from the features that matched the occurrence of the target word.

In the illustrated embodiment, Bayes' rule is utilized to update the probability of each word, $w_i$, based on a feature match with the target text. Bayes' rule is given by the following formula:

$$P(w_i | \mathcal{F}) = \left( \prod_{f \in \mathcal{F}} P(f | w_i) \right) \frac{P(w_i)}{P(\mathcal{F})}$$

where F is the set of features that matched the occurrence of the target word; $P(w_i|\mathcal{F})$ is the probability that word $w_i$ was intended, given that the set F of features has been found to match the target occurrence; $P(w_i)$ is the so-called prior probability of word $w_i$, which is the value to which the probability for word $w_i$ was initialized in 46; $P(\mathcal{F})$ is a scaling factor that need not be used as it does not affect the final outcome of the computation; and each term $P(f|w_i)$ is a so-called likelihood term that is used to update, at 58, the probabilities of the words $w_i$ given that feature $f$ has been found to match the target occurrence, and is calculated from the number of occurrences of feature $f$ in the combined corpus.

If the result of the test at 50 is that no feature that matches the target occurrence was found, then, as illustrated at 52, the correct word selected is that word, $w_i$, with the highest probability. It will be appreciated that when a word is selected as being correct by module 52, this word is entered into a text buffer 56 into which has previously been loaded the original target text. Following the selection by module 52 of the word, $w_i$, with the highest probability, the system iteratively cycles back to find the next occurrence of a target word in the target text, with the iteration continuing until all such occurrences have been processed. At this time, when no more occurrences are found, the text buffer 56 will contain the original target text, as modified by all spelling corrections made during the spelling-correction procedure. Corrected text 54 is therefore generated through the readout of the text buffer 56 as illustrated at 60 at the end of the sequence.

In summary, a combined corpus is formed in the training phase in which the target text is an integral part of the combined corpus and specially tailors the corpus to the text under consideration. Having formed the combined corpus, selected features are extracted to enable a more robust calculation of the probability that a given word is the correct word in the context of the target occurrence. By considering those words that could have been intended for the target word, as well as features, one can provide more accurate probabilities in a run-time sequence for text correction. Utilization of context words and collocations as features is by virtue of example only, as other features are within the scope of this invention.

Moreover, the method for selecting probabilities, while being described in terms of a Bayes' rule iterative process, is but one of a number of techniques for determining the probability of a word as being correct in a particular context.

The C code for the subject system follows, in two parts: feature extraction, and spelling correction. Code for feature extraction:

```
/*------------------------------------------------------------------*
|   Learn a set of features for discriminating among                 |
|   the words in a confusion set.  The features can be               |
|   either the presence of context words in a +/-K-word window       |
|   of the target word, or collocations of up to L elements          |
|   (words or tags) surrounding the target word.                     |
*------------------------------------------------------------------*/ include <stdio.h>
include <limits.h>          /* for INT_MAX */
#include <sys/types.h>
#include <sys/fcntl.h>
```

- 13 -

```c
#include <errno.h>
#include "db.h"
#include "process_args.h"
#include "spell-util.h"
#include "defs.h"
#include "window.h"
#include "word.h"
#include "bfeatures.h"
#include "tagsets.h"
#include "tribayes.h"

/* SMETRIC is the metric used to calculate the strength of association
   between a feature and the choice of word in the confset. */
#define SMETRIC     ACCURACY_METRIC
#define FEATURE_OCCS_THRESHOLD   10
#define CHI_SQUARE_SIG   0.95
#define HIST_MAX   20
#define NORMAL_PRUNING   -1
#define NO_GLOBAL_COUNT  -1

/* Possible actions for update_feature_count() */
#define INCREMENT 1
#define UNMARK 2
#define INCR_IF_UNMARKED 3

/* Global vars */
int quiet_p = TRUE;     /* normally defined in shell.c */

/* Static vars */
static char linebuff[MAXTEXTLINE];
static int verbose_p = FALSE;
static int prune_val = NORMAL_PRUNING;
static char tagbuff[MAXPOSLEN];

/* Forward declarations */
void train_bayes_first_pass(task *tsk, window *win, int half_width,
                            int cword_p, int tagsets_p, int stats_p);
void train_bayes_second_pass(task *tsk, window *win, int half_width,
                             int cword_p, int tagsets_p, char *tmpfile);
count *count_vector(int n);
void generate_collocations(window *win, int index, int n, int colloc_len,
                           int tagsets_p, DB *htable, int ok_to_create);
void generate_collocations_internal(int i, int maxlen, window *win,
                                    int index, int n, int tagsets_p,
                                    DB *htable, char *outbuff,
                                    int ok_to_create);
char *generate_collocation_el(char *start, char *end,
                              int position, char type, char *arg);
void generate_context_words(window *win, int index, int n, int window_k,
                            DB *htable, int ok_to_create);
DB *initialize_hash_table(void);
```

- 14 -

```
void store_features_in_hash_table(bfeature_list *bfeatures, DB *htable);
void update_feature_count(char *feature, int i, int n, DB *htable,
                         int action, int ok_to_create);
count *hash_table_lookup(char *feature, DB *htable);
count *hash_table_store(char *feature, int n, DB *htable);
void print_bayes_features_first_pass(DB *htable, count *totals,
                                     task *tsk);
int check_totals(count *totals, confset *cs);
void print_bayes_features_second_pass(bfeature_list *bfeatures,
                                      DB *htable,
                                      count corpus_size, confset *cs);
void check_corpus_occs(count corpus_occs, char *feature);
int feature_has_sufficient_data(count *occurrences, count *totals,
                                int n);
void print_bayes_feature(char *feature, float strength,
                         count *occurrences, int n, count tot);
void print_stats_on_number_of_bayes_features(DB *htable, count *totals,
                                             confset *cs);

/*---------------------------------------------------------------*
 |        Top-level routine for learning features                |
 *---------------------------------------------------------------*/

/* Gather statistics on all context-word or collocation features
   around an occurrence of the target word in the training set.
   A context-word feature tests for the presence of a context word
   in a +/-k-word window around the target word.
   A collocation feature tests for a pattern of up to l tags and
   words around the target word.
   Print a list of tuples: FEATURE STRENGTH M1 M2 ... Mn TOT
   See print_bayes_feature() for a description of these fields.
   Stdin should contain the sentences of the training corpus.
   The -w flag makes us learn context-word features, else we learn
   collocation features.  The -f flag is for doing a 2nd pass in which
   we collect global counts of features (only needed if the smoothing
   method for the task requires these global counts).

Dependencies:
   . the training corpus file, if user-defined (presumably this is
     what appears on stdin)
   . if learning collocations that depend on tagsets,
     we need the files for assigning tagsets to words:
     .tagsets, -tagsets.dag, and -unknown-tagsets.dag
     (plus .conv if tagsets are dict-based)
   . if learning as part of a trigram hybrid,
     we will also have to run the trigram alg to know which examples
     to train on (and to get tags for collocs, if appropriate) */ static char usage[] =
  "-t TASKNAME -p PCT:int [-w] [-v] [-s] [-P N] [-f TMPFILE]\n"
  "\t/* where: -w specifies context-word (not colloc) features\n"
```

- 15 -

```
    "\t        -v generates verbose output\n"
    "\t        -s prints statistics on num of features generated\n"
    "\t        -P prunes features iff # occs or non-occs < N\n"
    "\t        -f does 2nd pass of filling in global counts */";

int main(int argc, char *argv[])
{
  PROC_NAME(argv[0]);
  task *tsk;
  int pct, cword_p, half_width, stats_p, tagsets_p;
  window *win;
  char *taskname, *alg, *tmpfile;

process_args(argc, argv, usage, &taskname, &pct, &cword_p,
               &verbose_p, &stats_p, &prune_val, &tmpfile);
  init_spell_data_dir_from_env_var(SPELL_ENV_VAR);
  tsk = lookup_task(taskname);
  alg = task_algorithm(tsk);
  tagsets_p = task_colloc_tagsets_p(tsk);

if ((!cword_p) && (!hybrid_alg(alg)) && task_colloc_tags_p(tsk))
    myerror("tags unique only for hybrid algs; %s invalid", alg);

if (hybrid_alg(alg)) init_trigram_method();

if (cword_p) {
    if (!task_cword_p(tsk)) myerror("task doesn't use cwords");
    half_width = task_window_k(tsk);
  } else {
    if (!task_colloc_p(tsk)) myerror("task doesn't use collocs");
    half_width = task_colloc_len(tsk);
    if (tagsets_p) init_assign_tagset(tsk);
  }

/* Make a window of words to slide over stdin */
  win = init_window(half_width, pct, stdin);

if (tmpfile == NULL) {
    train_bayes_first_pass(tsk, win, half_width, cword_p,
                           tagsets_p, stats_p);
  } else {
    train_bayes_second_pass(tsk, win, half_width, cword_p,
                            tagsets_p, tmpfile);
  } exit(0);
}

/* First pass of Bayes training: create a list of bfeatures
   for distinguishing among the words in the confusion set.
   Create the list by finding bfeatures that co-occur with
   the words in the confusion set.  Print the list of bfeatures
```

```
    together with statistics of co-occurrence with the words
    in the confset. */
void train_bayes_first_pass(task *tsk, window *win, int half_width,
                            int cword_p, int tagsets_p, int stats_p)
{
  DB *htable;
  count *totals;
  int index, n, word_i, slen, trigrams_p, sugg;
  confset *cs;
  char *alg;
  wordptr *sent;
  probability sprob;
  prob_vector *pvec;

alg = task_algorithm(tsk);
  cs = task_confset(tsk);
  n = confset_length(cs);

htable = initialize_hash_table();
  totals = count_vector(n); /* total occs of each word in confset */ while ((index = window_next_confset_occurrence(cs, win)) !=
          NOT_FOUND) {
    if (hybrid_alg(alg)) {
      /* Build a tagged sent struct for trigrams
         (and cache the tags in win) */
      word_i = tag_sentence_in_window(0, win, &sent, &slen, &sprob);
      trigrams_p = apply_trigram_method(sent, word_i, sprob, cs, index,
                                        &sugg, &pvec);

/* If this is a hybrid alg, train only on non-trigram examples */
      if (trigrams_p) continue;
    } totals[index]++;

if (cword_p) {
      generate_context_words(win, index, n, half_width, htable, TRUE);
    } else {
      generate_collocations(win, index, n, half_width, tagsets_p,
                            htable, TRUE);
    }
  } print_bayes_features_first_pass(htable, totals, tsk);
  if (stats_p)
    print_stats_on_number_of_bayes_features(htable, totals, cs);
}

/* Second pass of Bayes training: given the list of bfeatures
   from the first pass, make another pass of the training corpus
   to collect statistics on the GLOBAL occurrence of the bfeatures --
```

```
   that is, the occurrence of the features in the whole corpus,
   not just co-occurring with the words in the confset.
   'tmpfile' is the absolute pathname of the file of bfeatures
   created in the first pass. */
void train_bayes_second_pass(task *tsk, window *win, int half_width,
                             int cword_p, int tagsets_p, char *tmpfile)
{
  DB *htable;
  count corpus_size;
  int index, n, word_i, slen, trigrams_p, sugg;
  confset *cs;
  char *alg;
  wordptr *sent;
  probability sprob;
  prob_vector *pvec;
  bfeature_list *bfeatures;

alg = task_algorithm(tsk);
  cs = task_confset(tsk);

htable = initialize_hash_table();
  bfeatures = cword_p ? read_cwords_internal(tsk, tmpfile) :
    read_collocs_internal(tsk, tmpfile);
  store_features_in_hash_table(bfeatures, htable);
  corpus_size = 0;   /* number of words in corpus */ while (window_next_confset_occurrence_or_nonoccurrence(cs, win)) {
    corpus_size++;

/* When generating bfeatures, pretend we matched the 0th word
       in the confset, and the confset contains 1 word.
       This 0th "word" will actually store the total occs
       of the bfeature. */
    if (cword_p) {
      generate_context_words(win, 0, 1, half_width, htable, FALSE);
    } else {
      generate_collocations(win, 0, 1, half_width, tagsets_p,
                            htable, FALSE);
    }
  } print_bayes_features_second_pass(bfeatures, htable, corpus_size, cs);
}

/* Return a vector of 'n' counts initialized to 0. */
count *count_vector(int n)
{
  count *vec;
  int i;

vec = (count *) mycalloc(n, sizeof(count));
  for (i = 0; i < n; i++) vec[i] = 0;
```

- 18 -

```
  return vec;
}

/*--------------------------------------------------------------------*
|    Generate collocations around the center word in the window       |
*--------------------------------------------------------------------*/

/* Generate all collocations up to length 'colloc_len' to describe
   the context around the center word in a window of words.
   For each collocation, increment the number of times it occurred
   for the center word.
   'win' is a window of words.
   'index' is the index (in the confusion set) of the center word.
   'n' is the number of words in the confusion set.
   'colloc_len' is the maximum length of collocation to generate.
   'tagsets_p' says whether to base the collocations on the tagsets
   of the words in the window, or on their actual TAGS
   (presumed unique), which are obtained by calling the tagger.
   'htable' is a hash table where we store the counts.
   'ok_to_create' says whether we're allowed to add new features
   to the hash table, or only increment counts of existing features. */
void generate_collocations(window *win, int index, int n,
                           int colloc_len, int tagsets_p,
                           DB *htable, int ok_to_create)
{
  int i1;

/* 'i1' is index of leftmost element in the collocation */
  for (i1 = -colloc_len; i1 <= 1; i1++) {
    /* Cannot start a collocation right AT the target word */
    if (i1 == 0) continue;

/* Don't try to start here if we're beyond start-of-sentence */
    if (i1 < -1 && word_in_sentence(i1+1, win) == NULL) continue;

generate_collocations_internal(i1, colloc_len, win, index, n,
                                   tagsets_p, htable, linebuff,
                                   ok_to_create);
  }
}

/* Like generate_collocations(), but just generates the portion of
   the collocation for one word in the window, word number 'i'.
   We then take the cross-product of this part of the collocation
   with the part of the collocation due to the rest of the window.
   'i' is the index in the window of the word
   to generate collocation elements for.
   'maxlen' is the max number of elements to add onto the collocation.
   'tagsets_p' says whether to make the collocations out of
   tags or tagsets.
```

- 19 -

```
    'outbuff' is the endpoint of the string representation
    of the collocation we're building.
    Other args are the same as for generate_collocations(). */
void generate_collocations_internal(int i, int maxlen, window *win,
                                    int index, int n, int tagsets_p,
                                    DB *htable, char *outbuff,
                                    int ok_to_create)
{
  char *feature, *newend, *p, *q;

if (i >= 0 && outbuff > linebuff) {
    /* Reached center word, and have generated some output
       (so didn't START at the center word) -- can terminate
       collocation here */
    *outbuff = '\0';
    update_feature_count(linebuff, index, n, htable, INCREMENT,
                         ok_to_create);
  }

/* If collocation is at its maximum length, or we've gone beyond
     the end of the sentence, we're done. */
  if (maxlen == 0 || (i > 1 && word_in_sentence(i-1, win) == NULL))
    return;

/* Try generating a colloc element testing the word at position i */
  if (i == 0) i++;  /* skip center word */
  feature = window_word_colloc_feature(WORD_EL, i, tagsets_p, win);

if (feature != NULL) {
    /* Generate a collocation element testing the word itself */
    newend = generate_collocation_el(linebuff, outbuff, i,
                                     WORD_EL, feature);
    generate_collocations_internal(i+1, maxlen-1, win, index, n,
                                   tagsets_p, htable, newend,
                                   ok_to_create);
  }

/* Generate colloc elements testing the tag(set) at position i */
  feature = window_word_colloc_feature(TAG_EL, i, tagsets_p, win);

if (tagsets_p) {
    /* Generate a collocation element for each tag in the tagset */
    for (q = feature; next_tag(&p, &q); ) {
      copy_substring(tagbuff, p, q);
      newend = generate_collocation_el(linebuff, outbuff, i,
                                       TAG_EL, tagbuff);
      generate_collocations_internal(i+1, maxlen-1, win, index, n,
                                     tagsets_p, htable, newend,
                                     ok_to_create);
    }
  } else {
    /* Generate a collocation element for the tag */
    newend = generate_collocation_el(linebuff, outbuff, i,
```

- 20 -

```
                                       TAG_EL, feature);
      generate_collocations_internal(i+1, maxlen-1, win, index, n,
                                     tagsets_p, htable, newend,
                                     ok_to_create);
  }
}

/* Print a collocation element to a string.
   Prepend a space if this is not the first element in the string.
   The string starts at 'start', and we print starting at 'end'.
   Return a pointer to the new end of the string.
   'position', 'type', and 'arg' are the components
   of the collocation element. */
char *generate_collocation_el(char *start, char *end,
                              int position, char type, char *arg)
{
  char *newend;

newend = end;
  if (newend > start) newend += sprintf(newend, " ");
  newend += sprint_colloc_el(newend, position, type, arg);

return newend;
}

/*----------------------------------------------------------------------*
 |    Generate context-word features around center word in window       |
 *----------------------------------------------------------------------*/

/* Generate all context-word features for the context
   of the center word in the word.  This involves simply
   incrementing the count of each context word within +/-k words
   of the center word.
   'win' is a window of words.
   'index' is the index (in the confusion set) of the center word.
   'n' is the number of words in the confusion set.
   'window_k' gives half-width of the context window
   (i.e., the 'k' in +/-k).
   'htable' is a hash table where we store the counts.
   'ok_to_create' says whether we're allowed to add new features
   to the hash table, or only increment counts of existing features. */
void generate_context_words(window *win, int index, int n, int window_k,
                            DB *htable, int ok_to_create)
{
  int i;
  char *wd;

/* Increment count of any word that appears at least once
     in the window.  To avoid overcounting for words that appear
     multiple times, we do this in two passes.
```

- 21 -

```
     First pass: Unmark all words in the window. */
  for (i = -window_k; i <= window_k; i++) {
    if (i == 0) continue;
    wd = window_word_cword_feature(i, win);

if (wd != NULL)
      update_feature_count(wd, index, n, htable,
                           UNMARK, ok_to_create);
  }

/* Second pass: Increment count and mark each word.
     If the word has already been marked, don't increment
     its count (would overcount). */
  for (i = -window_k; i <= window_k; i++) {
    if (i == 0) continue;
    wd = window_word_cword_feature(i, win);

if (wd != NULL)
      update_feature_count(wd, index, n, htable,
                           INCR_IF_UNMARKED, ok_to_create);
  }
}

/*---------------------------------------------------------------*
 |        Operations on hash tables                              |
 *---------------------------------------------------------------*/

/* Allocate and return a hash table. */
DB *initialize_hash_table(void)
{
  PROC_NAME("initialize_hash_table");
  DB *htable;
  HASHINFO ctl;

ctl.bsize = 512; /* increased from 256 to handle collocs of len 3 */
  ctl.cachesize = 16 * 1024 * 1024;  /* 16MEG gives dramatic speedup */
  ctl.ffactor = 8;
  ctl.hash = NULL;
  ctl.lorder = 0;
  ctl.nelem = 1000;
  htable = hash_open(NULL, O_RDWR | O_CREAT, 666, &ctl);

if (htable == NULL)
    myerror("Couldn't create hash table:\n%s", strerror(errno));

return htable;
}

/* Store all features in the list 'bfeatures' in the given hash table.
   Give them an 'occurences' vector consisting of a single count
```

```
   whose value is 0. */
void store_features_in_hash_table(bfeature_list *bfeatures, DB *htable)
{
  int len, i;
  bfeature *bf;

len = bfeature_list_len(bfeatures);

for (i = 0; i < len; i++) {
    bf = bfeature_list_get(i, bfeatures);
    sprint_bfeature_proper(linebuff, bf);
    hash_table_store(linebuff, 1, htable);
  }
}

/* Update the count that says how many times a feature occurred
   for the ith word in the confusion set.
    'feature' is a string representation of a Bayesian feature.
    'i' is the index of the word in the confusion set
    that the feature occurred for.
    'n' is the number of words in the confusion set.
    'htable' is the hash table storing the features and counts.
    The keys of the hash table are features.  The values are
    arrays of counts, which say the number of times
    a feature occurred for each word in the confusion set.
    'ok_to_create' says what to do if the given feature is not already
    in the hash table -- if it's ok to create, we create a new entry,
    else we return and do nothing.
    'action' says what to do with the count.
    INCREMENT: simply increment it -- no mark is used or stored.
    UNMARK: keep a flag for the feature, and clear the flag.
    INCR_IF_UNMARKED: if the flag is set, do nothing;
    if the flag is clear, increment the count and set the flag.
    The reason for having these marks is to avoid incrementing a
    feature more than once accidentally --
    see generate_context_words(). */
void update_feature_count(char *feature, int i, int n, DB *htable,
                          int action, int ok_to_create)
{
  PROC_NAME("update_feature_count");
  count *occurrences;
  int len;

occurrences = hash_table_lookup(feature, htable);

if (occurrences == NULL) {
    /* No existing entry */
    if (!ok_to_create) {
      /* Give up if not allowed to create a new entry */
      return;
    } else {
      /* Make a new entry.  Add an extra element
```

- 23 -

```
           at the end of 'occurrences' to store the mark (if any). */
      len = (action == INCREMENT) ? n : n+1;
      occurrences = hash_table_store(feature, len, htable);
      if (verbose_p) printf("Propose: %s\n", feature);
    }
  }

/* Take the specified action */
  if (action == INCREMENT) {
    occurrences[i]++;
  } else if (action == UNMARK) {
    occurrences[n] = FALSE;
  } else if (action == INCR_IF_UNMARKED) {
    if (!occurrences[n]) {
      occurrences[i]++;
      occurrences[n] = TRUE;
    }
  } else {
    myerror("invalid action (%d)", action);
  }
}

/* Look up a bfeature in the hash table.
   Return NULL if not found, else a pointer to
   its vector of occurrences (a vector of counts).
   Note that we return a pointer to a PREVIOUSLY-ALLOCATED
   vector of counts -- we do not allocate any new space. */
count *hash_table_lookup(char *feature, DB *htable)
{
  PROC_NAME("hash_table_lookup");
  DBT key, data;
  int stat;
  count *occurrences;

key.data = feature;
  key.size = strlen(feature) + 1;

/* Look in hash table for an entry for this feature */
  stat = (htable->get)(htable, &key, &data, 0);

if (stat < 0) {
    myerror("Hash table retrieval failed for \"%s\":\n%s",
            feature, strerror(errno));
  } else if (stat == 0) {
    /* Found an existing entry for this feature -- copy the 4 bytes
       for the pointer to the vector of counts. */
    memcpy((void *) (&occurrences), data.data, data.size);
  } else {
    occurrences = NULL;
  } return occurrences;
```

- 24 -

}

```
/* Add a new entry to a hash table for the given feature.
   The entry will be a pointer to a list of 'n' counts, all set to 0.
   'feature' is a string describing the feature.
   Return a pointer to the list of counts created. */
count *hash_table_store(char *feature, int n, DB *htable)
{
  PROC_NAME("hash_table_store");
  DBT key, data;
  count *occurrences;

key.data = feature;
  key.size = strlen(feature) + 1;

occurrences = count_vector(n);
  data.data = (void *) (&occurrences);
  data.size = sizeof(count *);

if ((htable->put)(htable, &key, &data, R_PUT))
    myerror("Hash table storage failed for \"%s\":\n%s",
            feature, strerror(errno));

return occurrences;
}

/*------------------------------------------------------------------*
 |    Print the bfeatures and their statistics                      |
 *------------------------------------------------------------------*/

/* After the first pass (in which we calculate statistics only for
   co-occurrence of bfeatures with the words in the confset),
   print a tuple describing the statistics of each feature.
   See print_bayes_feature() for a description.
   If the smoothing method being used in the task
   requires global counts, we simply print 0's for now
   (will be revised in the second pass).
   'htable' is a hash table containing the relevant information
   (see above).
   'totals' gives the number of occs of each word in the confset.
   'tsk' is the task. */
void print_bayes_features_first_pass(DB *htable, count *totals,
                                     task *tsk)
{
  PROC_NAME("print_bayes_features_first_pass");
  confset *cs;
  DBT key, data;
  int n, stat, i, ni, nj, **contab, non_zero, global_count;
  count *occurrences;
  float prob, strength;
```

- 25 -

```
  char *feature;

cs = task_confset(tsk);
  non_zero = check_totals(totals, cs);

/* First print confset (so can verify when reading later) */
  write_confset_verify(cs, stdout);

/* Print total num of occurrences of each word in the confset */
  n = confset_length(cs);
  global_count = task_smoothing_requires_global_counts(tsk) ?
    0 : NO_GLOBAL_COUNT;
  print_bayes_feature(CONFSET_TOTALS, 0.0, totals, n, global_count);

if (non_zero < 2) {
    /* Fewer than 2 confels OCCURRED in training data --
       so no point in learning features to discriminate among confels
       (and chi-square would break if we tried) */
    mywarning("%s occurred in training data ==> no features learned",
              (non_zero == 0) ? "no confels" : "only one confel");
    return;
  } init_contingency_table(&contab, &ni, &nj, totals, n);

for (stat = (htable->seq)(htable, &key, &data, R_FIRST);
       stat == 0;
       stat = (htable->seq)(htable, &key, &data, R_NEXT)) {
    feature = (char *) key.data;
    memcpy((void *) (&occurrences), data.data, data.size);
    if (!feature_has_sufficient_data(occurrences, totals, n))
      continue;

/* Run chi-square to test for association between feature
       and choice of word in the confusion set */
    fill_in_contingency_table(contab, feature, occurrences, totals, n);
    prob = chi_square_probability(contab, ni, nj);
    strength = association_strength(contab, ni, nj, SMETRIC);

/* Filter features whose probability of association is too low */
    if (prune_val == NORMAL_PRUNING && prob > 1.00 - CHI_SQUARE_SIG)
      continue;

/* Print a tuple for this feature. */
    print_bayes_feature(feature, strength, occurrences, n,
                        global_count);
  }
}

/* Check that 'totals', the vector giving the total number of
   occurrences of each confel, is valid.  They must fit in an int,
   to avoid overflowing the int entries in the contingency table.
```

- 26 -

```
   Complain and die if not.
   Return the number of non-zero totals.  (This is useful to know
   because if there are fewer than 2 non-zero totals,
   we can't run chi-square -- the calculation would break.) */
int check_totals(count *totals, confset *cs)
{
  PROC_NAME("check_totals");
  int i, n, non_zero;

n = confset_length(cs);
  non_zero = 0;

for (i = 0; i < n; i++) {
    if (totals[i] > 0) non_zero++;

if (! (totals[i] <= INT_MAX && totals[i] >= INT_MIN))
      myerror("totals[\"%s\"] = %ld won't fit in an integer",
              confel_spelling(i, cs), totals[i]);
  } return non_zero;
}

/* After the second pass (in which we count how many times
   each bfeature from the first pass occurs in the full corpus),
   print a tuple describing the statistics of each feature.
   See print_bayes_feature() for a description.
   For the co-occurrence statistics, we print the values gathered
   in the first pass; for the global statistics, we look up
   in the hash table the values obtained in the second pass.
   'bfeatures' is a list of the bfeatures gathered in the first pass.
   'htable' is a hash table containing the relevant information
   (see above).
   'corpus_size' is the number of words in the corpus.
   'cs' is the confusion set. */
void print_bayes_features_second_pass(bfeature_list *bfeatures,
                                      DB *htable, count corpus_size,
                                      confset *cs)
{
  PROC_NAME("print_bayes_features_second_pass");
  int i, j, n, len;
  count *occurrences1, *occurrences2, confset_tot;
  float strength;
  bfeature *bf;

/* 'occurrences1' is for converting vector of ints
     to vector of counts */
  n = confset_length(cs);
  occurrences1 = count_vector(n);

/* First print confset (so can verify when reading later) */
  write_confset_verify(cs, stdout);
```

- 27 -

```
  /* Print the total number of occurrences of each word
     in the confset */
  for (j = 0; j < n; j++)
    occurrences1[j] = bfeature_list_totals(bfeatures)[j];
  check_corpus_occs(corpus_size, CONFSET_TOTALS);
  print_bayes_feature(CONFSET_TOTALS, 0.0, occurrences1, n,
                      corpus_size);
  len = bfeature_list_len(bfeatures);

for (i = 0; i < len; i++) {
    bf = bfeature_list_get(i, bfeatures);
    sprint_bfeature_proper(linebuff, bf);
    occurrences2 = hash_table_lookup(linebuff, htable);

if (occurrences2 == NULL)
      myerror("feature \"%s\" not in hash table", linebuff);

/* Print a tuple for this feature.
       Copy occurrences1 from a vector of ints to a vector of counts.
       Get the global count from the (single) value
       in the hash table entry */
    for (j = 0; j < n; j++)
      occurrences1[j] = bfeature_occurrences(bf)[j];
    check_corpus_occs(occurrences2[0], linebuff);
    print_bayes_feature(linebuff, bfeature_strength(bf),
                        occurrences1, n, occurrences2[0]);

/* Sanity check: occs in whole corpus >= occs
       for words in confset */
    confset_tot = 0;
    for (j = 0; j < n; j++)
      confset_tot += bfeature_occurrences(bf)[j];
    if (! (occurrences2[0] >= confset_tot))
      myerror("feature \"%s\" has global occs (%d) "
              "< total confset occs (%d)",
              linebuff, occurrences2[0], confset_tot);
  } myfree(occurrences1);
}

/* Check that 'corpus_occs', the number of occurrences of a feature
   in the entire corpus, is valid.  It must fit in an int.
   Complain and die if not.
   'feature' is a string describing the feature
   (used for diagnostics). */
void check_corpus_occs(count corpus_occs, char *feature)
{
  PROC_NAME("check_corpus_occs");

if (! (corpus_occs <= INT_MAX && corpus_occs >= INT_MIN))
```

- 28 -

```c
    myerror("for feature \"%s\": corpus_occs = %ld "
            "won't fit in an integer",
            feature, corpus_occs);
}

/* Return TRUE iff a feature occurred enough times
   for us to make a decision about whether it is associated
   with the choice of words in the confusion set.
   We reject the feature if it occurred almost none of the time
   or almost all of the time -- in particular, the number of times
   it occurred (or didn't occur) is compared with a threshold.
   'totals' is the number of occurrences of each word
   in the confusion set.
   'n' is the length of 'occurrences'. */
int feature_has_sufficient_data(count *occurrences, count *totals,
                                int n)
{
  count occs, non_occs;
  int i, thresh;

occs = 0;
  non_occs = 0;

for (i = 0; i < n; i++) {
    occs += occurrences[i];
    non_occs += totals[i] - occurrences[i];
  } thresh = (prune_val == NORMAL_PRUNING) ?
    FEATURE_OCCS_THRESHOLD : prune_val;
  return (occs >= thresh && non_occs >= thresh);
}

/* Print a one-line entry giving a feature and its statistics.
   The entry will be: FEATURE STRENGTH M1 M2 ... Mn [TOT]
   For a context-word feature, FEATURE is the word being tested;
   for a collocation, it is a string representation of the collocation
   (which may include embedded whitespace!).
   STRENGTH is the strength of the association (using the metric
   given by the constant SMETRIC defined at the top of this file).
   M_i is the number of occurrences of FEATURE for the ith word
   in the confusion set.
   TOT is the total number of occurrences of the feature in the corpus
   (regardless of whether it occurred for a word in the confset).
   'feature' is a string representation of the feature.
   'occurrences' is the vector {M1, M2, ..., Mn}.
   'n' is the length of 'occurrences'.
   'tot' is the value TOT, or the value NO_GLOBAL_COUNT, which means
   there is no value to print. */
void print_bayes_feature(char *feature, float strength,
                         count *occurrences, int n, count tot)
```

```
{
  int i;

printf("%s %e", feature, strength);
  for (i = 0; i < n; i++) printf(" %d", (int) occurrences[i]);
  if (tot != NO_GLOBAL_COUNT) printf(" %d", (int) tot);
  printf("\n");
}

/* Print statistics to stderr on the number of occurrences
   of each feature.  In particular, we print a histogram
   saying how many features occurred 1 time,
   how many occurred 2 times, etc.  This is useful to get an idea
   of what would happen if we didn't prune features,
   but rather saved them all.
   'htable' is a hash table containing the relevant information
   (see above).
   'totals' gives the number of occurrences of each word
   in the confset.
   'cs' is the confusion set. */
void print_stats_on_number_of_bayes_features(DB *htable, count *totals,
                                             confset *cs)
{
  DBT key, data;
  int n, stat, i;
  count *occurrences, histogram[HIST_MAX+1], total, grand_total;

/* histogram[i] = number of features that occurred exactly i times.
     histogram[0] = number of features that occurred HIST_MAX
     or more times. */
  for (i = 0; i <= HIST_MAX; i++) histogram[i] = 0;
  grand_total = 0;

n = confset_length(cs);

/* Enter each feature into histogram */
  for (stat = (htable->seq)(htable, &key, &data, R_FIRST);
       stat == 0;
       stat = (htable->seq)(htable, &key, &data, R_NEXT)) {
    memcpy((void *) (&occurrences), data.data, data.size);

/* Count number of occurrences of this features. */
    total = 0;
    for (i = 0; i < n; i++) total += occurrences[i];

if (total > HIST_MAX) {
      histogram[0]++;
    } else {
      histogram[total]++;
    } grand_total++;
```

```
      }

/* Print the histogram */
    fprintf(stderr, "\n");
    fprintf(stderr, "# occs\t# features\n");
    for (i = 1; i <= HIST_MAX; i++)
      fprintf(stderr, "%d\t%ld\n", i, histogram[i]);
    fprintf(stderr, "> %d\t%ld\n", HIST_MAX, histogram[0]);
    fprintf(stderr, "-----\t-----\ntotal\t%ld\n", grand_total);
    fprintf(stderr, "\n");
}
```

The code for spelling correction follows:

```
/*----------------------------------------------------------------------*
|    Bayesian method for context-sensitive spelling correction          |
*----------------------------------------------------------------------*/ include <stdio.h>
include <string.h>
#include <ctype.h>
#include <math.h>          /* for pow() */
#include "spell-util.h"
#include "defs.h"
#include "window.h"
#include "word.h"
#include "bfeatures.h"
#include "tagsets.h"
#include "tribayes.h"
#include "bayes.h"
#include "stats.h"

/* For MMSE: if ratio of lhood/max_lhood < ACC_RATIO,
   we ignore this term */
#define ACC_RATIO (1e-6)

/* Static vars */
static prob_vector *bayes_pvec = NULL;
static int bayes_feature_matched = FALSE;
static int verbose = FALSE;
static long int bfeature_count = 0;
static long int total_occs = 0;
static bfeature **accepted_cwords = NULL;
static int num_accepted_cwords = 0;
static int accepted_cwords_len = 0;

/* Forward declarations */
int acceptable_bfeature(int i, bfeature_info *finfo,
                        window *win, int tagsets_p,
                        bfeature **left_colloc,
                        bfeature **right_colloc);
int cword_colloc_dependency(bfeature *cword, bfeature *colloc);
void init_bayes_prob_vars(bfeature_info *finfo);
void update_bayes_prob_vars(bfeature *bf, bfeature_info *finfo);
probability smooth_prob(int occs, int total,
                        bfeature *bf, bfeature_info *finfo);
probability mle_prob(int m, int n);
probability add1_prob(int m, int n);
probability mmse_prob(int m, int n);
double mmse_likelihood(int i, int m, int n, double *num, double *den);
double mypower(float m, int n);
probability interp_prob(int m, int n, int m_global, int n_global);
int most_probable_word(void);
void mark_bayes_dont_change_probabilities(bfeature_info *finfo);
void bayes_prediction_header_msg(window *win, task *tsk);
void bayes_prediction_threshold_msg(int i, int num_bfeatures,
```

- 32 -

```
                                           float sthresh);
void bfeature_announce_msg(bfeature *bf);
void bfeature_reject_msg(bfeature *other_bf);
void bfeature_next_probability_msg(int occs, int total,
                                   bfeature *bf, bfeature_info *finfo);
void bfeature_probabilities_trailer_msg(prob_vector *pvec, int n);
void bayes_prediction_trailer_msg(int sugg, confset *cs, int rulei,
                                  bfeature_info *finfo);
void init_accepted_cwords(task *tsk);
void add_accepted_cword(bfeature *bf);
bfeature *any_cword_colloc_dependency(bfeature *colloc);

/*---------------------------------------------------------------------*
 |    Apply Bayesian method                                            |
 *---------------------------------------------------------------------*/

/* Predict which word in the confset should replace the confel
   that matched the window starting at its "current" word.
   This function works by estimating the probability that the word
   should be word #i in the confset by multiplying P(f|word #i)
   for all specified features f. Two kinds of features are currently
   supported. Context-word features say that a particular word
   occurred at least once within a +/- k-word window
   around the target word.
   Collocation features say that a particular pattern
   of words and/or tags occurred around the target word.
   To avoid multiplying "egregiously dependent" probabilities
   together, we use the following strategy: we match features
   in decreasing order of strength (i.e., we try the potentially
   most informative features first). If a feature matches,
   before accepting its evidence, we check whether it is
   egregiously dependent on any previously-matched feature.
   If so, we ignore the new feature. Else we multiply in
   its probabilities. ("Egregiously dependent" is defined
   in a function below.) In the end, we select the word in the confset
   with the greatest probability. We add BAYESIAN_FUDGE_FACTOR
   to the numerator and denominator of each probability,
   to avoid 0 probabilities (which would kill the product).
   This is basically Bayes' rule, where we omit the denominator
   (the product of the P(f) terms), since this denominator
   would be the same for each word in the confset, and hence
   does not affect the comparison.
   Btw: if the task's algorithm is decision lists, and not Bayes,
   then we base our decisions on the first bfeature found only.
   By Bayes' rule, this is identical to picking the word
   in the confset with the largest P(word|f), where f is
   the first bfeature found.
   'sthresh' is a strength threshold below which
   features are disregarded.
   Return three values: 'sugg', 'pvec', and 'rulei'.
   'sugg' is the index in the confset of the word with
```

```
   highest Bayesian prob.
   'pvec' gives the Bayesian probability assigned to each word.
   The ith prob can also be DONT_CHANGE, with the interpretation
   that if the ith word were given as the original word,
   then we wouldn't be confident enough to suggest changing it.
   We currently say we are not confident in ALL words
   iff our decision is based just on the priors
   (i.e., no feature matched).
   'rulei' is the index of the rule of record -- i.e.,
   the one credited with producing whatever answer we come up with. */
void apply_bayes_method(window *win, task *tsk, bfeature_info *finfo,
                        float sthresh, int *sugg, prob_vector **pvec,
                        int *rulei)
{
  int i, current_best, new_best, ok, dlist_p, tagsets_p, len;
  confset *cs;
  bfeature *left_colloc, *right_colloc, *bf;

if (verbose) bayes_prediction_header_msg(win, tsk);
  cs = task_confset(tsk);
  dlist_p = (task_algorithm(tsk) == DLIST_ALG);
  tagsets_p = task_colloc_tagsets_p(tsk);

/* Match all cwords at once for efficiency. */
  match_cwords(finfo, win, task_window_k(tsk));

/* Initialize vector of probs assigned to each word in confset */
  init_bayes_prob_vars(finfo);
  current_best = most_probable_word();
  *rulei = bfeature_index(NULL, finfo);

/* Now go down the list of bfeatures by decreasing strength.
     If a feature matches and has no "egregious dependencies"
     on earlier matching feature, use it as evidence
     to update our probs. */
  left_colloc = NULL;
  right_colloc = NULL;
  len = num_bfeatures(finfo);

for (i = 0; i < len; i++) {
    bf = get_bfeature(i, finfo);

if (!bfeature_above_threshold_p(bf, sthresh)) {
      /* This bfeature and all following ones
         are below strength threshold */
      if (verbose) bayes_prediction_threshold_msg(i, len, sthresh);
      break;
    } ok = acceptable_bfeature(i, finfo, win, tagsets_p,
                             &left_colloc, &right_colloc);

if (ok) {
```

- 34 -

```
    update_bayes_prob_vars(bf, finfo);
    new_best = most_probable_word();
    incr_bfeature_count();   /* counts # of bfeatures actually used */

/* The rule "of record" is the 1st rule that matches (for dlists)
       or the last rule to change the choice of word (for Bayes) */
    if (dlist_p || current_best != new_best)
      *rulei = bfeature_index(bf, finfo);

current_best = new_best;
    if (dlist_p) break;    /* stop after accepting first bfeature */
  } else {
    set_bfeature_match(bf, FALSE);
  }
  }
}

/* Pick the index of the word in the confset
   with the largest probability */
*sugg = most_probable_word();
if (verbose) bayes_prediction_trailer_msg(*sugg, cs, *rulei, finfo);
mark_bayes_dont_change_probabilities(finfo);
*pvec = bayes_pvec;
}

/* Check whether the ith bfeature for a task
   (a) matches for the center word in the window, and
   (b) is not egregiously dependent on previously-matching features.
   Return TRUE iff both of these conditions are met.
   'i' is the index of the feature to evaluate.
   'win' is a window of words; we're matching against its center word.
   'tagsets_p' says whether collocations match against tags or tagsets.
   'left_colloc' and 'right_colloc' give the collocs, if any,
   that have already been successfully matched against the window.
   We update 'left_colloc' and 'right_colloc' as a side effect. */
int acceptable_bfeature(int i, bfeature_info *finfo,
                        window *win, int tagsets_p,
                        bfeature **left_colloc,
                        bfeature **right_colloc)
{
  PROC_NAME("acceptable_bfeature");
  bfeature *bf, *bf2;
  int left_p, right_p, j;

bf = get_bfeature(i, finfo);

if (cword_bfeature_p(bf)) {
    /* 'match' field already says whether feature matches */
    if (!bfeature_match(bf)) return FALSE;
    if (verbose) bfeature_announce_msg(bf);

/* We assume no egregious dependencies between one cword
       and another.  Check for egregious dependencies
```

```
      between cword and a colloc. */
   if (*left_colloc != NULL &&
       cword_colloc_dependency(bf, *left_colloc)) {
     if (verbose) bfeature_reject_msg(*left_colloc);
     return FALSE;
   } if (*right_colloc != NULL &&
       cword_colloc_dependency(bf, *right_colloc)) {
     if (verbose) bfeature_reject_msg(*right_colloc);
     return FALSE;
   } return TRUE;

} else if (colloc_bfeature_p(bf)) {
   /* First check for egregious dependencies with other collocs --
      that's easy -- dependent iff they match on same side
      of center word */
   determine_colloc_sides_matched(bf, &left_p, &right_p);
   if ((left_p && *left_colloc != NULL) ||
       (right_p && *right_colloc != NULL))
     return FALSE;

/* Now try matching against the window */
   if (!colloc_matches_window(bf, win, tagsets_p)) return FALSE;
   if (verbose) bfeature_announce_msg(bf);

/* Finally, check for egregious dependencies with
      previously-matched cwords */
   for (j = 0; j < i; j++) {
     bf2 = get_bfeature(j, finfo);

if (cword_bfeature_p(bf2) && bfeature_match(bf2) &&
         cword_colloc_dependency(bf2, bf)) {
       if (verbose) bfeature_reject_msg(bf2);
       return FALSE;
     }
   }

/* Passes all tests -- now just update 'left_colloc'
      and 'right_colloc' */
   if (left_p) *left_colloc = bf;
   if (right_p) *right_colloc = bf;
   return TRUE;

} else {
   myerror("bfeature #%d has invalid type", i);
 }
}

/* Return TRUE iff there is an egregious dependency between
```

```
   a context-word feature and a collocation feature.
   We say that this is so iff the collocation includes a word element
   that tests for the cword.
   (One could argue that there is also an egregious dependency
   if the collocation includes a tag element that matches
   a tag in the cword's tagset. However, this seems overly
   conservative. For instance, suppose the colloc
   includes "Prep" as a tag. Does that affect the probability
   of finding the cword "in"? Probably not much. There is likely
   to be a certain number of prepositions within +/-k words
   of the target word anyway; the fact that we know there is
   one FOR SURE (as tested by the colloc) does not change
   the expected number of prepositions much.)
   'cword' is a bfeature for a context-word feature.
   'colloc' is a bfeature for a collocation. */
int cword_colloc_dependency(bfeature *cword, bfeature *colloc)
{
  return collocation_tests_for_cword(colloc, cword);
}

/*-----------------------------------------------------------------------*
|    Operations on Bayes probability static vars:                        |
|                                                                        |
|    bayes_pvec: vector of probabilities assigned to each word           |
|      in the confusion set                                              |
|    bayes_feature_matched: TRUE iff at least one bfeature matched       |
*-----------------------------------------------------------------------*/

/* Initialize the Bayes probability static vars.
   Set 'bayes_pvec' to the prior probabilities of the words
   in the confset, first allocating it, if we haven't already done so.
   Set 'bayes_feature_matched' to FALSE.
   'finfo' is the set of all features for the task. */
void init_bayes_prob_vars(bfeature_info *finfo)
{
  int i, n, total, occs;
  int *totals;
  probability prob;

totals = bfeature_totals(finfo);
  n = bfeature_totals_len(finfo);
  if (bayes_pvec == NULL) bayes_pvec = new_prob_vector();
  init_prob_vector(bayes_pvec, n);
  bayes_feature_matched = FALSE;   /* global var */ if (verbose) bfeature_announce_msg(NULL);

/* Prior probabilities should sum to 1 -- so divide by total */
  total = 0;
  for (i = 0; i < n; i++) total += totals[i];
```

```
  /* Set priors */
  for (i = 0; i < n; i++) {
    occs = totals[i];
    prob = smooth_prob(occs, total, NULL, finfo);
    set_prob_vector(i, bayes_pvec, prob);
    if (verbose)
      bfeature_next_probability_msg(occs, total, NULL, finfo);
  } if (verbose) bfeature_probabilities_trailer_msg(bayes_pvec, n);
}

/* Update the Bayes probability static vars for
   having matched feature 'bf'.
   We multiply the ith element of 'bayes_pvec'
   by the probability P(bf|word #i).
   We set 'bayes_feature_matched' to TRUE.
   'finfo' is the set of all features for the task. */
void update_bayes_prob_vars(bfeature *bf, bfeature_info *finfo)
{
  PROC_NAME("update_bayes_prob_vars");
  int i, n, occs, total;
  int *totals;
  probability newprob;

if (bayes_pvec == NULL)
    myerror("call init_bayes_prob_vars() first");
  totals = bfeature_totals(finfo);
  n = bfeature_totals_len(finfo);

/* Update the probabilities in 'bayes_pvec' */
  for (i = 0; i < n; i++) {
    occs = (bfeature_occurrences(bf))[i];
    total = totals[i];
    newprob = smooth_prob(occs, total, bf, finfo);
    set_prob_vector(i, bayes_pvec,
                    get_prob_vector(i, bayes_pvec) * newprob);
    if (verbose) bfeature_next_probability_msg(occs, total, bf, finfo);
  } bayes_feature_matched = TRUE; /* global var */
  if (verbose) bfeature_probabilities_trailer_msg(bayes_pvec, n);
}

/* Return a smoothed estimate of P(f|wd), the conditional probability
   of feature 'f' occurring, given that the target word was 'wd'.
   We use whatever smoothing method is specified for the current task:

. SMOOTH_ADD1: returns (occs+1)/(total+1), which is basically
     the MLE with 1's added to avoid getting zero probabilities
     (which would give bad results when the probs are multiplied
``` to get the overall likelihood).

. SMOOTH_MMSE: does the MMSE estimate of P(f|wd); i.e., asks,
  for each possible value p_0 of P(f|wd), what is the probability
  that p_0 is the correct value, given that we have observed m/n
  cases of feature 'f' occurring; takes a probability-weighted
  average of the p_0's to give an expected estimate
  of the true prob.

. SMOOTH_INTERP: interpolates between the MLE of P(f|wd) and P(f);
  the weighting factor is the probability that 'f' is INDEPENDENT
  of 'wd', and therefore that P(f) is the correct probability
  to use.

. SMOOTH_APPROX_INTERP: like SMOOTH_INTERP, but estimates P(f)
  by looking only at the target words in the confusion set,
  not at the whole training set (to save several orders of
  magnitude of compute time when training).

'occs' and 'total' are the quantities mentioned above.
'bf' is the bfeature giving the 'f' for the desired P(f|wd),
or NULL, which means we want the prior probability of 'wd'.
'finfo' is the bfeature_info describing the whole set
of bfeatures. */
```
probability smooth_prob(int occs, int total,
                        bfeature *bf, bfeature_info *finfo)
{
  PROC_NAME("smooth_prob");
  char *smoothing_type;
  int *totals;
  int i, n, global_total, global_occs;

smoothing_type = bfeature_smoothing_type(finfo);

if (bf == NULL) {
    /* Want prior, P(wd) -- don't do any smoothing,
       just use straight MLE */
    return mle_prob(occs, total);
  } else {
    /* Want P(f|wd) -- apply the smoothing method specified
       in the task */
    if (smoothing_type == SMOOTH_ADD1) {
      return add1_prob(occs, total);
    } else if (smoothing_type == SMOOTH_MMSE) {
      return mmse_prob(occs, total);
    } else if (smoothing_type == SMOOTH_INTERP) {
      /* Need unigram prob, P(f), for whole trainset */
      global_total = bfeature_corpus_size(finfo);
      global_occs = bfeature_corpus_occs(bf);
      return interp_prob(occs, total, global_occs, global_total);
    } else if (smoothing_type == SMOOTH_APPROX_INTERP) {
      /* Estimate unigram prob, P(f), over just the words
         in the confset */
```

- 39 -

```
      totals = bfeature_totals(finfo);
      n = bfeature_totals_len(finfo);
      global_total = 0;
      global_occs = 0;

for (i = 0; i < n; i++) {
        global_total += totals[i];
        global_occs += (bfeature_occurrences(bf))[i];
      } return interp_prob(occs, total, global_occs, global_total);
    } else {
      myerror("unknown smoothing type: \"%s\"", smoothing_type);
    }
  }
}

/* Given that a feature was observed to occur 'm' times
   in a total of 'n' samples, return the estimate for 'p',
   the probability of the feature occurring in the full population.
   Use the maximum likelihood estimate (MLE), m/n. */
probability mle_prob(int m, int n)
{
  return ((probability) m) / ((probability) n);
}

/* Like mle_prob(), but we add 1 to the numerator and denominator
   to avoid returning a probability of 0.0 (which would zero out
   the product when calculating the overall likelihood in
   Bayes' rule). */
probability add1_prob(int m, int n)
{
  return (((probability) m) + 1.0) / (((probability) n) + 1.0);
}

/* Given that a feature was observed to occur 'm' times
   in a total of 'n' samples, return the estimate for 'p',
   the probability of the feature occurring in the full population.
   We use a minimum mean-square error (MMSE) estimate, which is
   the EXPECTED VALUE of p, obtained from the probability distribution
   that shows the probability that the true proportion, p, is p_0,
   for each possible value of p_0. We calculate these probabilities
   using Bayes' rule, and asking the question of how likely it is
   that we would have observed m/n if the underlying probability
   were p_0. See also the long explanation in our 'progress'
   file for 3/7/96. (NB: When n=1, the MMSE works out to 0.0 or
   1.0, which is NOT what we want. So we complain and die if n=1.) */
probability mmse_prob(int m, int n)
{
  PROC_NAME("mmse_prob");
```

- 40 -

```c
  int i;
  double lhood, max_lhood, num, den;

if (! (m >= 0 && m <= n && n > 1))
    myerror("got m = %d, n = %d but need 0 <= m <= n and n > 1", m, n);

/* MMSE(m/n) = SUM_i (i/n)*P(i/n) where
     P(i/n) is proportional to i^m * (n-i)^(n-m)
     Note that biggest term is term #m (= MAP estimate of m/n ratio).
     To make the calculation tractable, just use biggest terms
     in the calculation, centered around term #m --
     this produces a slight underestimate. */
  num = 0.0;
  den = 0.0;

/* Start w/ biggest term */
  max_lhood = mmse_likelihood(m, m, n, &num, &den);

/* Do terms preceding biggest until likelihood is small enough */
  for (i = m-1; i >= 0; i--) {
    lhood = mmse_likelihood(i, m, n, &num, &den);
    if (lhood/max_lhood < ACC_RATIO) break;
  }

/* Do terms after biggest until likelihood is small enough */
  for (i = m+1; i <= n; i++) {
    lhood = mmse_likelihood(i, m, n, &num, &den);
    if (lhood/max_lhood < ACC_RATIO) break;
  } return (probability) (num/den);
}

/* Return the likelihood part of term #i in the MMSE calculation.
   Update 'num' and 'den' (the numerator and denominator in the
   overall calculation) as a side effect. */
double mmse_likelihood(int i, int m, int n, double *num, double *den)
{
  double lhood;
  float scale1, scale2;

/* Take powers of i/scale_fac to avoid numeric under/overflow.
     Pick powers s.t. biggest term (term #m) is near 1.0.
     Add 1 to scale_fac to avoid division by 0. */
  scale1 = (float) (m+1);
  scale2 = (float) (n-m+1);
  lhood = mypower(i/scale1, m) * mypower((n-i)/scale2, n-m);

(*num) += lhood * i;
  (*den) += lhood * n;
  return lhood;
}
```

- 41 -

```
/* Return m^n for nonnegative real m, nonnegative int n. */
double mypower(float m, int n)
{
  double res;

if (m == 0.0 && n == 0) {
    res = 1.0;
  } else if (m == 0.0) {
    res = 0.0;
  } else if (n == 0) {
    res = 1.0;
  } else {
    res = pow((double) m, (double) n);
  } return res;
}

/* Estimate the conditional probability P(f|wd) by
   a "backing off" interpolation:

Let r = P(f) = frequency of feature 'f' in the whole population
         m/n = the value of P(f|wd) measured in our sample
      lambda = P(m/n|r) = the prob of the "null hypothesis" --
               i.e., that f is independent of wd, and thus the prob of
               observing m/n in our sample given that r is the frequency
               in the whole population Then our estimate is:
   P(f|wd) = lambda * r + (1-lambda) * m/n 'm' and 'n' are the parameters mentioned above, and allow us
   to calculate the MLE of P(f|wd) in our sample.
   'm_global' and 'n_global' similarly allow us to calculate
   the MLE of P(f) in the whole population. */
probability interp_prob(int m, int n, int m_global, int n_global)
{
  float r, lambda;
  probability p_est;

r = ((float) m_global) / ((float) n_global);

/* Get binomial prob of exactly m/n --
     subtract consec cumulative vals */
  lambda = binomial(m, n, r) - ((m == n) ? 0.0 : binomial(m+1, n, r));

/* Interpolate using lambda as weight */
  p_est = lambda * r  +  (1-lambda) * (((float) m)/n);

return p_est;
```

```c
}

/* Return the index of the largest probability in 'bayes_pvec'. */
int most_probable_word(void)
{
  PROC_NAME("most_probable_word");

if (bayes_pvec == NULL) myerror("call init_bayes_prob_vars() first");
  return prob_vector_max_index(bayes_pvec);
}

/* For each word in the confset, decide whether, if that word
   were given as the original word in the sentence,
   we would be confident enough to suggest changing it.
   We currently say we are not confident in ALL words
   if our decisiion is based just on the priors
   (i.e., no feature matched).
   Set probabilities in 'bayes_pvec' as a side effect.
   'finfo' is the set of all features for the task. */
void mark_bayes_dont_change_probabilities(bfeature_info *finfo)
{
  int i, n;

if (bayes_pvec == NULL)
    myerror("call init_bayes_prob_vars() first");
  n = bfeature_totals_len(finfo);

if (!bayes_feature_matched)
    for (i = 0; i < n; i++)
      set_prob_vector(i, bayes_pvec, DONT_CHANGE);
}

/*----------------------------------------------------------------*
 |   Verbose printouts                                            |
 *----------------------------------------------------------------*/

/* Set 'verbose' flag. */
void set_bayes_verbose_flag(int val)
{
  verbose = val;
}

/* Print a message saying which target instance we're about to do
   Bayesian prediction for. */
void bayes_prediction_header_msg(window *win, task *tsk)
{
  confset *cs;
  int i, n;
```

- 43 -

```c
  char *word;
  char *alg;

cs = task_confset(tsk);
  n = confset_length(cs);
  alg = task_algorithm(tsk);

printf("\nApplying %s to {", nontrigram_component_alg(alg));
  for (i = 0; i < n; i++)
    printf("%s\"%s\"", (i == 0) ? "" : ", ", confel_spelling(i, cs));
  printf("} in:\n");

print_context_window(win);
  printf("\n");
}

/* Print a message saying that we stopped looking for bfeatures
   because we hit the strength threshold before checking
   feature #i. */
void bayes_prediction_threshold_msg(int i, int num_bfeatures,
                                    float sthresh)
{
  printf("  --> Hit strength threshold (%f); "
         "disregarded %d/%d features\n",
         sthresh, num_bfeatures - i, num_bfeatures);
}

/* Print a message saying which bfeature we're about to consider
   in calculating the probabilities.
   'bf' is the bfeature at issue, or NULL
   for the prior probabilities. */
void bfeature_announce_msg(bfeature *bf)
{
  printf("  ");

if (bf == NULL) {
    printf("Priors");
  } else {
    print_bfeature_proper(bf);
  } printf(":");
}

/* Print a message saying why a bfeature was rejected --
   either it conflicted with another, already-selected bfeature,
   or it failed to match.
   'other_bf' is the already-selected bfeature or
   NULL if the bfeature failed to match. */
void bfeature_reject_msg(bfeature *other_bf)
```

- 44 -

```c
{
  if (other_bf == NULL) {
    printf(" mismatches\n");
  } else {
    printf(" conflicts with ");
    print_bfeature_proper(other_bf);
    printf("\n");
  }
}

/* Print a message showing the next probability being
   multiplied in with the existing probabilities.
   'occs' and 'total' are the numerator and denominator
   of this probability.
   'bf' is the bfeature whose probability is being printed,
   or NULL for the prior probabilities.
   'finfo' is the bfeature_info for the whole set of bfeatures. */
void bfeature_next_probability_msg(int occs, int total,
                                   bfeature *bf, bfeature_info *finfo)
{
  printf("   %d/%d=%g",
         occs, total, smooth_prob(occs, total, bf, finfo));
}

/* Print a message after updating the probabilities
   showing the cumulative probabilities so far.
   'pvec' is the vector of cumulative probabilities.
   'n' is the number of words in the confset. */
void bfeature_probabilities_trailer_msg(prob_vector *pvec, int n)
{
  int i;

printf("\n");
  printf("   --> Probs so far: ");
  for (i = 0; i < n; i++) printf(" %g", get_prob_vector(i, pvec));
  printf("\n");
}

/* Print a message giving the conclusion of Bayes' method --
   either we're suggesting a word, or we don't have enough evidence
   to suggest one (because our conclusion is based just on the priors).
   Also show the rule of record.
   'sugg' is the index in the confset of the confel w/ highest prob.
   'rulei' is the index of the rule "of record". */
void bayes_prediction_trailer_msg(int sugg, confset *cs, int rulei,
                                  bfeature_info *finfo)
{
  bfeature *bf;

bf = decode_bfeature_index(rulei, finfo);
```

- 45 -

```c
  if (!bayes_feature_matched) {
    printf("  ==> no conclusion; no features apply\n");
  } else {
    printf("  ==> suggesting \"%s\"; rule of record: ",
           confel_spelling(sugg, cs));

if (bf == NULL) {
      printf(" <priors>");
    } else {
      print_bfeature_proper(bf);
    } printf("\n");
  }
}

/*---------------------------------------------------------------------*
 |      Collect statistics on number of bfeatures                      |
 *---------------------------------------------------------------------*/

/* Initialize statistics on number of bfeatures.
   We simply reset the global counters to 0. */
void init_bfeature_stats(void)
{
  bfeature_count = 0;
  total_occs = 0;
}

/* Increment the global 'bfeature_count' counter. */
void incr_bfeature_count(void)
{
  bfeature_count++;
}

/* Increment the global 'total_occs' counter. */
void incr_total_occs(void)
{
  total_occs++;
}

/* Report statistics on feature counts. */
void report_bfeature_stats(FILE *out)
{
  fprintf(out, "Bfeature count: %ld\n", bfeature_count);
  fprintf(out, "Total occurrences: %ld\n", total_occs);
}
```

Having above indicated several embodiments of the Subject Invention, it will occur to those skilled in the art that modifications and alternatives can be practiced within the spirit of the invention. It is accordingly intended to define the scope of the invention only as indicated in the following claims:

What is claimed is:

1. A system for providing context sensitive word correction in which the context of a word in a sentence is utilized to determine which of several alternative or possible correctly-spelled words was intended, comprising:

a conventional training corpus;

a target text having errors in which the word usage is mostly correct, but sometimes incorrect;

means for combining said conventional training corpus and said target text into a combined corpus;

means coupled to said combined corpus for ascertaining the probability that a word in said target text is the correct word based on the occurrence of said word in said combined corpus, such that context sensitive word correction is trained not only on a conventional training corpus, but also on a target text which contains word usage errors whereby the correspondence of said training corpus to said target text need not be strong, and whereby there is no user supplied feedback to supervise the training process.

2. The system of claim 1, and further including means for extracting a feature from said combined corpus and wherein said means for ascertaining the probability that a word in said target text is the correct word includes means coupled to said feature for altering said probability based on the occurrence of said feature in said target text.

3. The system of claim 2, wherein said feature is a context word.

4. The system of claim 2, wherein said feature is a collocation.

5. The system of claim 2, wherein said means for ascertaining the probability that a word in said target text is the correct word includes means for updating the probability that a word could have been intended for the target word via the application of Bayes' rule.

6. The system of claim 2, wherein said means for ascertaining the probability that a word in said target text is the correct word includes means for assigning an initial probability to a word that could have been intended for the target word in accordance with the ratio of the probability that said word occurred in said combined corpus to the probability that any of the words that could have been intended for the target word occurred in said combined corpus.

7. A method of correcting target text, comprising the steps of:

analyzing uncorrected target text to create a training corpus; and applying the training corpus to the uncorrected target text to identify a first word as an erroneous word to be replaced to correct the uncorrected target text.

8. The method according to claim 7, further comprising the step of:

replacing the identified first word with a second to correct the uncorrected target text.

9. The method according to claim 8, wherein the first word is a correctly spelled word and the second word is a correctly spelled word.

10. The method according to claim 7, wherein the first word is erroneous based upon a context-sensitive spelling error.

11. The method according to claim 7, wherein the analyzing of the uncorrected target text includes determining correct contextual use of the second word in the uncorrected target text.

12. The method according to claim 7, wherein:

the analyzing includes determining rules of use for the second word; and the corpus corresponds to the determined rules of use.

13. The method according to claim 7, wherein the training corpus is a first training corpus and further comprising the steps of:

replacing the identified first word with a second to correct the uncorrected target text;

applying a second training corpus, created by analyzing training text different than the uncorrected target text, to the uncorrected target text to identify a third word as an erroneous word; and replacing the identified third word with a fourth word to further correct the uncorrected target text.

14. The method according to claim 13, wherein the third word is a misspelled word and the fourth word is a correctly spelled word.

15. The method according to claim 7, wherein:

the analyzing includes identifying inconsistencies in the uncorrected target text; and the training corpus corresponds to the identified inconsistencies.

16. The method according to claim 7, wherein the analyzing includes determining features that characterize a context in which the first word appears in the uncorrected target text and a context in which the second word appears in the uncorrected target text.

17. The method according to claim 16, wherein the determined features include at least one of:

a particular key word occurring within a distance of the first word and within the same distance of the second word in the uncorrected target text, and a pattern of part-of-speech and specific words within a context of the first word and within a context of the second word.

18. The method according to claim 16, wherein the analyzing further includes eliminating those of the features which are determined on the basis of less than a threshold amount of data.

19. A system for replacing a word within uncorrected target text with another word to correct the uncorrected target text, comprising:

a training corpus created from uncorrected target text; and a buffer configured to store the uncorrected target text including a first word which is an erroneous word, and to replace, the first word with a second word, determined on the basis of the training corpus, to correct the uncorrected target text.

20. The system according to claim 19, wherein the first word is a correctly spelled word and the second word is a correctly spelled word.

21. The system according to claim 19, wherein the first word is erroneous based upon a context-sensitive spelling error.

22. The system according to claim 19, wherein the training corpus is a first training corpus and further comprising:
   a second training corpus created from other than the uncorrected target text;
   the uncorrected target text includes a third word which is an erroneous word; and
   the buffer is further configured to replace the third word with a fourth word, determined on the basis of the second training corpus, to correct the uncorrected target text.

* * * * *